United States Patent
Fraley et al.

(10) Patent No.: US 8,925,353 B2
(45) Date of Patent: Jan. 6, 2015

(54) PROCESS AND SYSTEM FOR FINING GLASS

(75) Inventors: Raymond Eugene Fraley, Waverly, NY (US); Paul Richard Grzesik, Corning, NY (US); Lawrence Henry Kotacska, Big Flats, NY (US); William Brashear Mattingly, III, Painted Post, NY (US); James Patrick Murphy, Corning, NY (US)

(73) Assignee: Corning Incorporated, Corning, NY (US)

( * ) Notice: Subject to any disclaimer, the term of this patent is extended or adjusted under 35 U.S.C. 154(b) by 1388 days.

(21) Appl. No.: 12/264,562

(22) Filed: Nov. 4, 2008

(65) Prior Publication Data

US 2009/0120133 A1    May 14, 2009

Related U.S. Application Data

(60) Provisional application No. 61/002,425, filed on Nov. 8, 2007.

(51) Int. Cl.
    C03B 5/02    (2006.01)
    C03B 5/225   (2006.01)
    C03B 5/43    (2006.01)

(52) U.S. Cl.
    CPC .. *C03B 5/225* (2013.01); *C03B 5/43* (2013.01)
    USPC .......................... 65/135.6; 65/134.1; 65/347

(58) Field of Classification Search
    USPC ..................... 65/135.6, 134.1, 347
    See application file for complete search history.

(56) References Cited

U.S. PATENT DOCUMENTS

| | | | |
|---|---|---|---|
| 3,708,271 A * | 1/1973 | Loewenstein et al. | 65/512 |
| 3,777,040 A   | 12/1973 | Gell et al. | 13/6 |
| 4,494,974 A * | 1/1985 | Vilk et al. | 65/337 |
| 4,622,678 A * | 11/1986 | Scarfe | 373/134 |
| 4,780,122 A   | 10/1988 | Schwenninger et al. | |
| 4,882,736 A   | 11/1989 | Pieper | |

(Continued)

FOREIGN PATENT DOCUMENTS

| | | | |
|---|---|---|---|
| JP | S63-310734 | 12/1988 | |
| JP | S64-018926 | 1/1989 | |
| JP | 2005-119958 | 5/2005 | |
| WO | WO 2008/108943 | 12/2008 | ............. C03B 5/225 |

OTHER PUBLICATIONS

Biser, Benjamin Franklin, Elements of glass and glass making. Glass and Pottery Publishing Company, Pittsburgh, PA. 1899, p. 54.*

(Continued)

*Primary Examiner* — Richard Crispino
*Assistant Examiner* — Yana B Krinker
(74) *Attorney, Agent, or Firm* — Matthew J. Mason; Stephen S. Wentsler; Kevin M. Able

(57) ABSTRACT

A glass making process comprising a step of fining the molten glass in a fining vessel comprising a top wall portion not in direct contact with the molten glass, and a side wall portion in direct contact with the molten glass, wherein the top wall portion has a temperature T(top), the side wall portion has a temperature T(side), and T(top)−T(side)≤10° C., and a glass fining system. The invention is particularly useful for glass fining systems comprising a metal fining vessel made of precious metals such as Pt and/or Pt—Rh alloys.

23 Claims, 2 Drawing Sheets

(56) References Cited

U.S. PATENT DOCUMENTS

| | | | |
|---|---|---|---|
| 4,906,272 A | 3/1990 | Boettner | 65/346 |
| 6,286,337 B1 | 9/2001 | Palmquist | 65/157 |
| 6,769,272 B2 | 8/2004 | Roeth et al. | 65/134.9 |
| 6,848,275 B1* | 2/2005 | Kolberg et al. | 65/356 |
| 2004/0067369 A1* | 4/2004 | Ott et al. | 428/432 |
| 2004/0177649 A1 | 9/2004 | Dorfeld et al. | 65/90 |
| 2005/0155387 A1* | 7/2005 | Hayes et al. | 65/346 |
| 2006/0242995 A1* | 11/2006 | Bookbinder et al. | 65/134.1 |
| 2006/0242996 A1* | 11/2006 | DeAngelis et al. | 65/134.1 |

OTHER PUBLICATIONS

Rathke, Sicco, *Advances in Direct Heated Platinum Coatings for Glass Manufacture*, Handbuch Der Glastechnik: Production, Properties and Applications of Refractory and Platinum Group Metals for the Contract with Glass Melts:: Hüttentechnische Vereingigung Der Deutschen Glasindustrie, 2006, pp. 77-90, XP002517046 p. 85, line 1-p. 86, line 9.

* cited by examiner

PROCESS AND SYSTEM FOR FINING GLASS

CROSS-REFERENCE TO RELATED APPLICATION

This application claims the benefit of priority to U.S. provisional application No. 61/002,425, filed on Nov. 8, 2007, the content of which is incorporated herein by reference in its entirety.

TECHNICAL FIELD

The present invention relates to process and system for fining molten glass. In particular, the present invention relates to glass fining process and system comprising a metal fining vessel. The present invention is useful, e.g., in the direct heated platinum fining system for making LCD glass substrate.

BACKGROUND

An exemplary process for manufacturing glass articles begins with the melting of raw feed materials, such as metal oxides, to form a molten glass. The melting process not only results in the formation of glass, but also the formation of various unwanted by-products, including various gases such as oxygen, carbon dioxide, carbon monoxide, sulfur dioxide, sulfur trioxide, argon, nitrogen, and water. Unless removed, these gases can continue throughout the manufacturing process, ending up as small, sometimes microscopic gaseous inclusions or blisters in the finished glass article.

For some glass articles, the presence of small gaseous inclusions is not detrimental. However, for other articles of manufacture, gaseous inclusions as small as 50 μm in diameter are unacceptable. One such article is the glass sheet used in the manufacture of display devices such as liquid crystal and organic light emitting diode displays. For such applications, the glass must have extraordinary clarity, pristine surfaces, and be essentially free of distortion and inclusions.

To remove gaseous inclusions from the molten glass, a fining agent or agents are typically added to the feed material. The fining agent can be a multivalent oxide, such as $As_2O_3$. $As_2O_3$ is converted into $As_2O_5$ during glass melting process. During fining stage, the following reaction occurs:

$$As_2O_5 \rightarrow As_2O_3 + O_2(gas)$$

The released oxygen forms gas bubbles in the molten glass, or melt. The gas bubbles allow other dissolved gases to be collected and rise to the surface of the melt, where it is removed from the process. The heating is typically performed in a high temperature fining vessel.

The fining temperatures for display-grade glasses can be as high as 1700° C. Temperatures this high require the use of specialized metals or alloys to prevent destruction of the vessel. Platinum or platinum alloys, such as platinum-rhodium are typically used. Platinum advantageously has a high melting temperature and does not easily dissolve in the glass. Nevertheless, at such high temperatures, the platinum or platinum alloy readily oxidizes. Therefore, steps must be taken to prevent contact between the hot platinum fining vessel and atmospheric oxygen. Other measures for reducing the oxidation of Pt during glass fining and delivery is highly desired as well.

Higher fining temperature of the molten glass is desired in order to obtain higher quality glass for a given residence time in the fining vessel. However, the material forming the fining system such as one made with a metal or a metal alloy, has a maximal operating temperature. Therefore, it would be desirable to have a glass fining system which provides a high fining temperature to the molten glass without exceeding the highest operating temperature of the metal.

The present invention satisfies this need.

SUMMARY

Accordingly, a first aspect of the present invention is a glass making process comprising a step of fining the molten glass in a fining vessel comprising a top wall portion not in direct contact with the molten glass, and a side wall portion in direct contact with the molten glass, wherein the top wall portion has a temperature T(top), the side wall portion has a temperature T(side), and T(top)−T(side)≤10° C.

In certain embodiments of the first aspect of the present invention, T(top)−T(side)≤5° C.

In certain embodiments of the first aspect of the present invention, the wall portions of the vessel comprises a metal.

In certain embodiments of the first aspect of the present invention, the vessel is heated by passing an electric current through the wall portions.

In certain embodiments of the first aspect of the present invention, the wall portions of the vessel comprise Pt.

In certain embodiments of the first aspect of the present invention, T(side)≥1600° C., in certain embodiments T(side)≥1630° C., in certain embodiments T(side)≥1650° C., in certain embodiments T(side)≥1660° C., in certain embodiments T(side)≥1670° C., in certain embodiments T(side)≥1680° C., in certain embodiments T(side)≥1690° C., in certain embodiments T(side)≥1700° C.

In certain embodiments of the first aspect of the present invention, the molten glass is a borosilicate glass, in certain embodiments an aluminoborosilicate glass.

In certain embodiments of the first aspect of the present invention, the fining vessel is supported by a cradle in which the vessel is placed.

In certain embodiments of the first aspect of the present invention, the fining vessel is enclosed by multiple layers of heat-insulating materials.

In certain embodiments of the first aspect of the present invention, the fining vessel is enclosed by at least one layer of heat-insulating material rated for a working temperature of at least 1650° C.

In certain embodiments of the first aspect of the present invention, the fining vessel is enclosed by at least one layer of fire board.

In certain embodiments of the first aspect of the present invention, the side wall portion of the fining vessel is further differentially heated by supplemental heating, such as by passing a current through a Pt heating system or other direct metal heating system.

In certain embodiments of the first aspect of the present invention, cooling fins or heat sinks are installed on the outside of the top wall portion of the fining vessel.

In certain embodiments of the first aspect of the present invention, the top wall portion of the fining vessel has a larger thickness than the side wall portion.

In certain embodiments of the first aspect of the present invention, the wall portions of the fining vessel comprises a metal, and the oxidation of the metal is reduced compared to where T(top)−T(side)≥30° C.

A second aspect of the present invention is a glass fining system comprising:

a metal vessel operable to allow a molten glass to fine therein, having a top wall portion which the molten glass essentially does not directly contact, and a side wall portion which the motel glass directly contact, during a glass fining process;

a first temperature sensor operable to sense the temperature of the top wall portion, and a second temperature sensor operable to sense the temperature of the side wall portion;

a current supply operable to supply an electric current through the wall portions of the metal vessel to heat the top wall portion and the side wall portion of the fining vessel;

a cradle supporting the metal vessel; and a heat-insulating enclosure containing the metal vessel;

wherein the fining system is operable to maintain a difference between the temperature of the top wall portion, T(top), and the temperature of the side wall portion of the vessel, T(side), during the fining process, wherein T(top)−T(side) ≤10° C.

In certain embodiments of the second aspect of the present invention, the system further comprises a heating element operable to differentially heat the side wall portion of the metal vessel, such as a direct Pt heating system or other direct metal heating system.

In certain embodiments of the second aspect of the present invention, a cooling fin or a heat sink is installed on the outside of the top wall portion of the metal vessel.

In certain embodiments of the second aspect of the present invention, the top wall portion of the metal vessel has a higher thickness than the side wall portion.

In certain embodiments of the second aspect of the present invention, the heat-insulating enclosure comprises at least one layer of fire board.

In certain embodiments of the second aspect of the present invention, the metal vessel comprises Pt and/or an alloy thereof.

One or more embodiments of the present invention has one or more of the following advantages: (i) higher quality glass with fewer defects can be produced; (ii) oxidation of metal, such as precious metal, used in the construction of the fining vessel can be reduced, thus extending the life span of the system; (iii) superior thermal insulation of the system can be achieved; and (iv) optimal temperature uniformity of the molten glass can be obtained by using the present invention; (iv) significant capital savings can be realized; and (v) higher select of the glass produced can be obtained.

DETAILED DESCRIPTION

Figure 1:
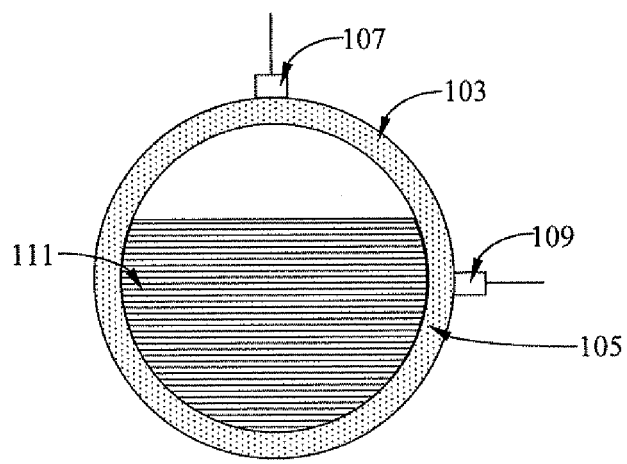
FIG. 1 is a schematic illustration of the cross-section of a metal fining vessel used in accordance with one embodiment of the present invention.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a fining vessel" includes embodiments having two or more fining vessels, unless the context clearly indicates otherwise.

A typical glass fining system comprises a fining vessel where molten glass is contained for a certain period of residence time, where gas bubbles inside the molten glass are allowed to rise from inside the molten glass to the surface. All other conditions being equal, the lower the viscosity of the molten glass, the easier it is for the bubbles to form and rise in the melt. It is desirable that the molten glass in the fining vessel is heated to a sufficiently high temperature to allow for a sufficiently low glass viscosity. The highest temperature the glass melt can reach is determined in part by the material of the fining vessel. Take a fining system comprising a Pt fining vessel as an example. The temperature of the molten glass cannot exceed the melting temperature of Pt. Pure Pt has a melting point of 1768° C. The mechanical integrity of the Pt fining vessel can be seriously compromised if it is heated to a temperature close to its melting point.

As mentioned above, differing parts of the fining vessel of a fining system may be subjected to differential heating during a fining process, due in part to the differing environment they are exposed to. The lower part of a fining vessel functions as a carrier and holder of molten glass, and thus is in direct contact with the glass. However, the upper part is reserved for gas to escape and thus is typically free from direct contact with the glass melt during the fining step. The differing heat transfer rate of glass and gas can lead to a non-negligible temperature gradient between the top and the side/bottom of the fining vessel. In the present application, the temperature of the top portion is measured at the top of the fining vessel. The temperature at this area tends to have the highest temperature of the fining vessel. The temperature of the side portion of the fining vessel is measured at the side of the fining vessel below the melting glass surface line. This area has a temperature very close to that of the glass melt in direct contact therewith.

The present inventors have found that maintaining a low temperature gradient between the top and the side/bottom of the fining vessel can allow for a much higher fining temperature of the glass melt, increase the fining efficiency and efficacy, and improve the glass quality.

In addition, it has been found that, by reducing the temperature gradient between the top and the side/bottom of the fining vessel, oxidation of the metal can be reduced, thereby extending service life of the fining system.

Certain fining systems use direct heating of the fining vessel by passing an electric current through the vessel wall. Certain other fining systems use a separate, indirect and independent heating device, such as metal windings, SiC heating rods, and the like, to heat the fining vessel. Certain other fining systems use a combination of direct and indirect heating means. The present invention can be applied to all these fining systems.

The present invention is illustrated below in the context of a direct-heat platinum fining system (DHPS). It is to be noted that DHPS is merely one embodiment of the present invention, and the present invention may be implemented in other glass making systems as well.

FIG. 1 is a schematic illustration of the cross-section of the metal vessel containing molten glass 111. 103 is the top wall portion of the metal vessel, not in direct contact with molten glass 111; 105 is the side wall portion of the vessel, in direct contact with molten glass 111; 107 is a first temperature sensor (such as a thermocouple) operable to sense the temperature of the top wall portion; and 109 is a second temperature sensor operable to sense the temperature of the side wall portion. By use of the two temperature sensors, the temperature gradient between the top and side/bottom portions of the fining vessels are monitored. In the case of a DHPS, electric currents fed into the fining vessel can be modulated and adjusted accordingly, so that the top portion and the side/bottom portions are heated differentially to maintain the temperature gradient within desired range.

Figure 2:
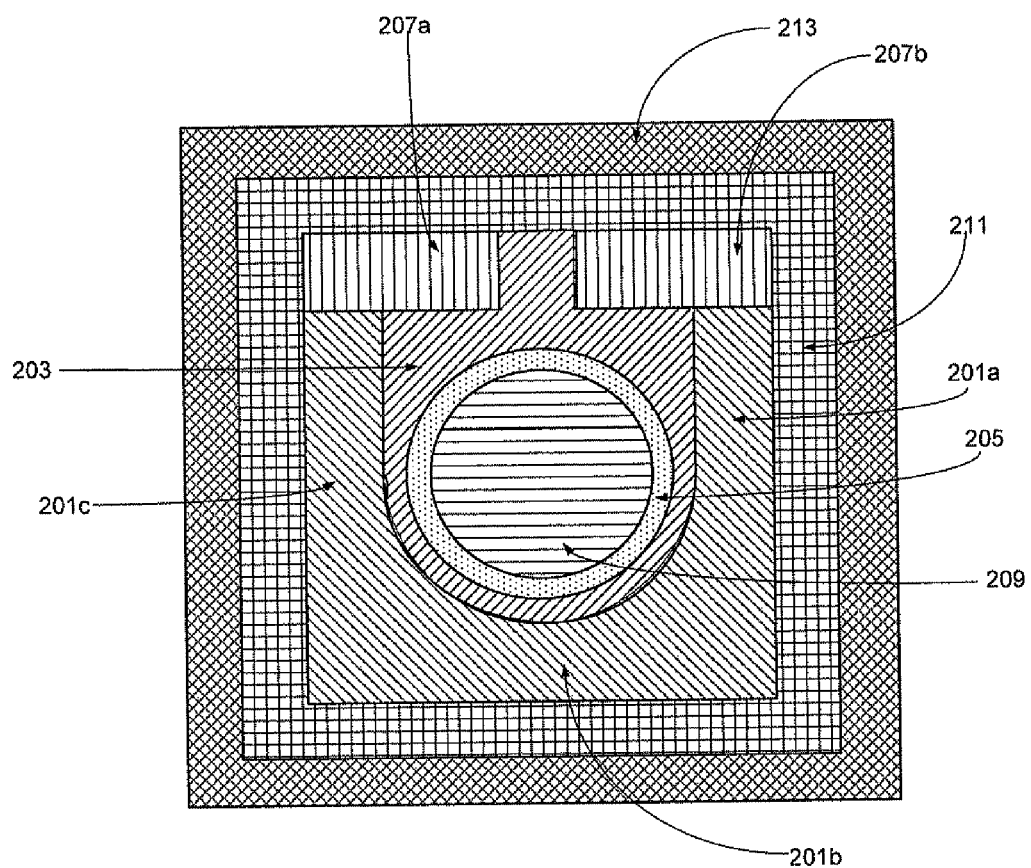
FIG. 2 is a schematic illustration of the cross-section of a fining system according to one embodiment of the present invention.

FIG. 2 is a schematic illustration of the cross-section of a fining system according to one embodiment of the present invention. 205 is the metal vessel in which molten glass 209 is contained and fined. 201a, 201b and 201c are a first side wall, a base, and a second side wall of a deep cradle containing the vessel 205. 203 is a bedding material between the cradle walls and the vessel. 207a and 207b are cover plates covering the vessel and the bedding material. 211 and 213 are thermal insulating layers enclosing the cradle and the vessel. 213 is advantageously made of fire boards (such as high temperature-resistant fiber boards made of ceramic fiber). In this embodiment, the use of a deep cradle, in addition to the full insulation of the fining vessel, results in minimal heat loss in the fining process and maintains the temperature gradient of the fining vessel within a desired range.

A typical direct heat finer system constructed with high thermal conductivity materials such as alumina insulating firebrick inherently develops a large thermal gradient between the finer top and the tube section below it. The reason for this is that the glass line is lower than the finer top height thus leaving an air space or free glass surface for gas bubbles to escape. The area of the finer top which is not in contact with any glass runs hotter since there is no heat loss into the glass. As a result the maximum glass temperature obtainable is limited by the finer top temperature which is determined by the finer material melting temperature. The larger the temperature gradient ($\Delta T$), the lower the glass temperature and the fining capabilities are reduced.

Various approaches can be used to reduce the temperature gradient ($\Delta T$) between the top portion and the side portions of the fining vessel. Exemplary approaches to reduce the $\Delta T$ between the top and bottom of the finer include, but are not limited to: (a) supplemental heating via platinum or Kanthal™ windings; (b) insulation package of insulating fire brick and fiberboard; and (c) cooling fins or heat sinks located at the "hot" part of the finer; and (d) alternate top design such as two piece construction or increased thickness, and combinations thereof. In certain embodiments, where active heating or cooling is utilized, such as in approach (a) and/or (c), it is desired that the heating and/or cooling is controlled by the use of a feedback loop. Thus, the temperature gradient between the top and the side portions of the fining vessel are sensed and monitored, and the supplemental heating element, and/or external cooling device, are adjusted and controlled, in conjunction with the direct heating system, if present, to work together to achieve the desired temperature gradient between the top and the side portions. The use of a thicker top portion of the fining vessel can increase the mechanical integrity of the top portion of the fining vessel, even if the top portion is heated to a higher temperature than the side portions. This approach can increase the cost of the fining vessel quite significantly, especially where previous metals, such as Pt and/or Pt—Rh alloys, are employed to construct the high-temperature resistant fining vessel.

The preferred embodiment is the use of insulating fire brick and/or fire board as the other methods would require additional energy and power equipment in the case of the windings. The cooling fins or heat sinks could create localized condensation points for $PtO_2$, which could generate platinum inclusions. In addition, the increased insulation value allows for similar or even higher glass temperatures while using less power.

Ability to Raise Glass Temperature to Improve Fining Capability

Data have shown a fining system according to the present invention utilizing multiple layers of fire boards for thermal insulating cradles achieved a T(top)−T(side)≈10° C. Whereas in a comparative finer having essentially the same dimension and geometry without sufficient thermal insulation of the fining vessel, a temperature difference of T(top)−T(side)≈40° C. was observed.

Data showed that power consumption of the fining system of the present invention is significantly lower. A finer according to the present invention comprising a deep cradle and multiple layers of fire board thermal insulation consumes only about 60-80% of the power required of a comparison finer comprising a less-deep cradle and without multiple layers of fire board thermal insulation.

Quality of the glass fined by using the fining system according to the present invention was significantly higher than glass fined by using comparison fining system. Glass fined by using comparison finers comprised about 1.7~6 times blisters of the glass fined according to the present invention. Without intending to be bound by any particular theory, it is believed this is due to the higher temperature of the molten glass achieved in the finer.

Total loss of glass therefore is much lower for the present invention.

Figure 3:
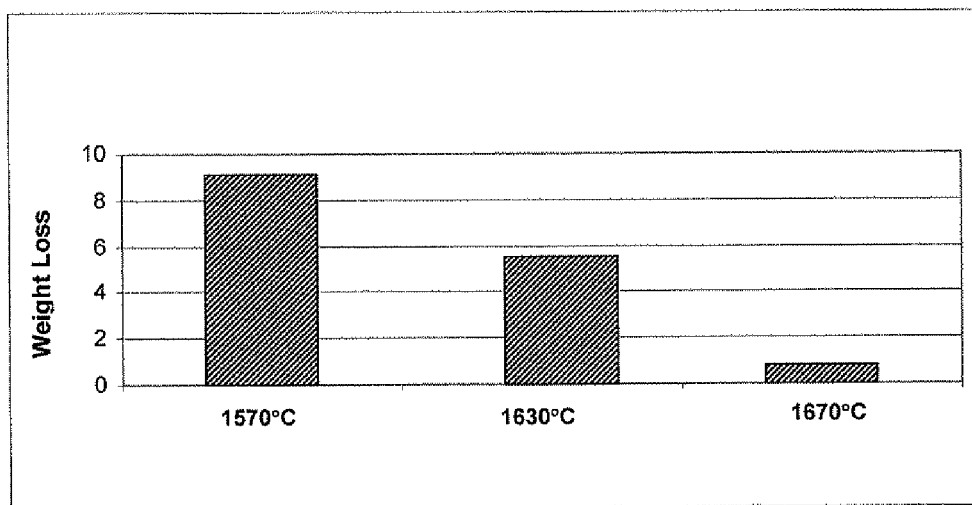
FIG. 3 is a diagram showing the oxidation (indicated by weight loss) of Pt—Rh alloy at various temperature and temperature gradient.

Reduction of Precious Metal Oxidation to Control Glass Leaks Via Low Thermal Conductivity Insulation Direct heated platinum systems encompass a voltage across a metal, in certain embodiments, platinum or alloy thereof, which in turn causes the metal to heat up. This method is used to heat the precious metal components of the LCD glass delivery system. As a result, the precious metal reaches a significantly higher temperature than the ambient environment or surrounding components. The combination of high temperature and large temperature gradient ($\Delta T$) between platinum and the environment causes an increase in the oxidation rate of the platinum. This situation results in higher oxidation rates than if the precious metal were non-direct heated. The data in FIG. 3 shows that oxidation rates are dependent on the temperature gradient. Shown on the vertical axis of this figure is weight loss (in terms of $g \cdot inch^{-2} \cdot month^{-1}$) of a Ph-20Rh sample at 1670° C. Shown on the horizontal axis is the ambient temperature the test Pt-20Rh plate was subjected to. Therefore, any approach that can lower the temperature gradient effect may significantly lower oxidation rates of the precious metal. The present invention therefore will reduce the oxidation of the metal vessel wall.

The use of a better insulating package is going to reduce the amount of power necessary for optimal operation, which means that the platinum surface, especially in the top wall portion, can run at a lower temperature. Lower power means a lower oxidation rate, which implies the precious metal will maintain its integrity longer. Consequently, for direct heat components such as a glass finer, the time to failure due to glass leaks or structural weakness will occur later.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A glass making process comprising the steps of:
    fining molten glass in a fining vessel comprising a top wall portion not in direct contact with the molten glass, and a side wall portion in direct contact with the molten glass, wherein the top wall portion has a temperature T(top), the side wall portion has a temperature T(side); and
    reducing a temperature gradient between the top wall portion and the side wall portion such that T(top)−T(side) ≤10° C.

2. A glass making process according to claim 1, wherein T(top)>T(side).

3. A glass making process according to claim 2, wherein T(top)−T(side)≥5° C.

4. A glass making process according to claim 1, wherein the wall portions of the vessel comprises a metal.

5. A glass making process according to claim 4, wherein the vessel is heated by passing an electric current through the wall portions.

6. A glass making process according to claim 1, wherein the wall portions of the vessel comprises Pt.

7. A glass making process according to claim 1, wherein the T(side)≥1600° C.

8. A glass making process according to claim 1, wherein the molten glass is a borosilicate glass.

9. A glass making process according to claim 1, wherein the step of reducing the temperature gradient includes supporting the fining vessel by a cradle.

10. A glass making process according to claim 1, wherein the step of reducing the temperature gradient includes enclosing the fining vessel with multiple layers of heat-insulating materials.

11. A glass making process according to claim 10, wherein the multiple layers of heat-insulating materials includes at least one layer of heat-insulating material rated for 1650° C. working temperature.

12. A glass making process according to claim 1, wherein the step of reducing the temperature gradient includes enclosing the fining vessel with at least one layer of fire board.

13. A glass making process according to claim 1, wherein the step of reducing the temperature gradient includes differentially heating the side wall portion of the vessel by supplemental heating.

14. A glass making process according to claim 13, wherein the supplemental heating is provided by passing a current through a direct metal heating system.

15. A glass making process according to claim 1, wherein the step of reducing the temperature gradient includes installing a heat sink on the outside of the top wall portion of the fining vessel.

16. A glass making process according to claim 15, wherein the heat sink comprises cooling fins.

17. A glass making process according to claim 1, wherein the step of reducing the temperature gradient includes providing the top wall portion of the fining vessel with a larger thickness than the side wall portion.

18. A glass making process according to claim 1, wherein the wall portions of the fining vessel comprises a metal, and the oxidation of the metal is reduced compared to where T(top)−T(side)≥30° C.

19. A glass making process comprising the steps of:
    fining molten glass in a fining vessel comprising a top wall portion not in direct contact with the molten glass, and a side wall portion in direct contact with the molten glass, wherein the top wall portion has a temperature T(top), the side wall portion has a temperature T(side); and
    increasing a maximum temperature of the molten glass within the fining vessel by reducing a temperature gradient between the top wall portion and the side wall portion such that T(top)−T(side)≤10° C.

20. A glass making process according to claim 19, wherein the step of reducing the temperature gradient includes supporting the fining vessel by a cradle.

21. A glass making process according to claim 19, wherein the step of reducing the temperature gradient includes enclosing the fining vessel with multiple layers of heat-insulating materials.

22. A glass making process according to claim 21, wherein the multiple layers of heat-insulating materials includes at least one layer of heat-insulating material rated for 1650° C. working temperature.

23. A glass making process according to claim 19, wherein the step of reducing the temperature gradient includes enclosing the fining vessel with at least one layer of fire board.

* * * * *